UNITED STATES PATENT OFFICE.

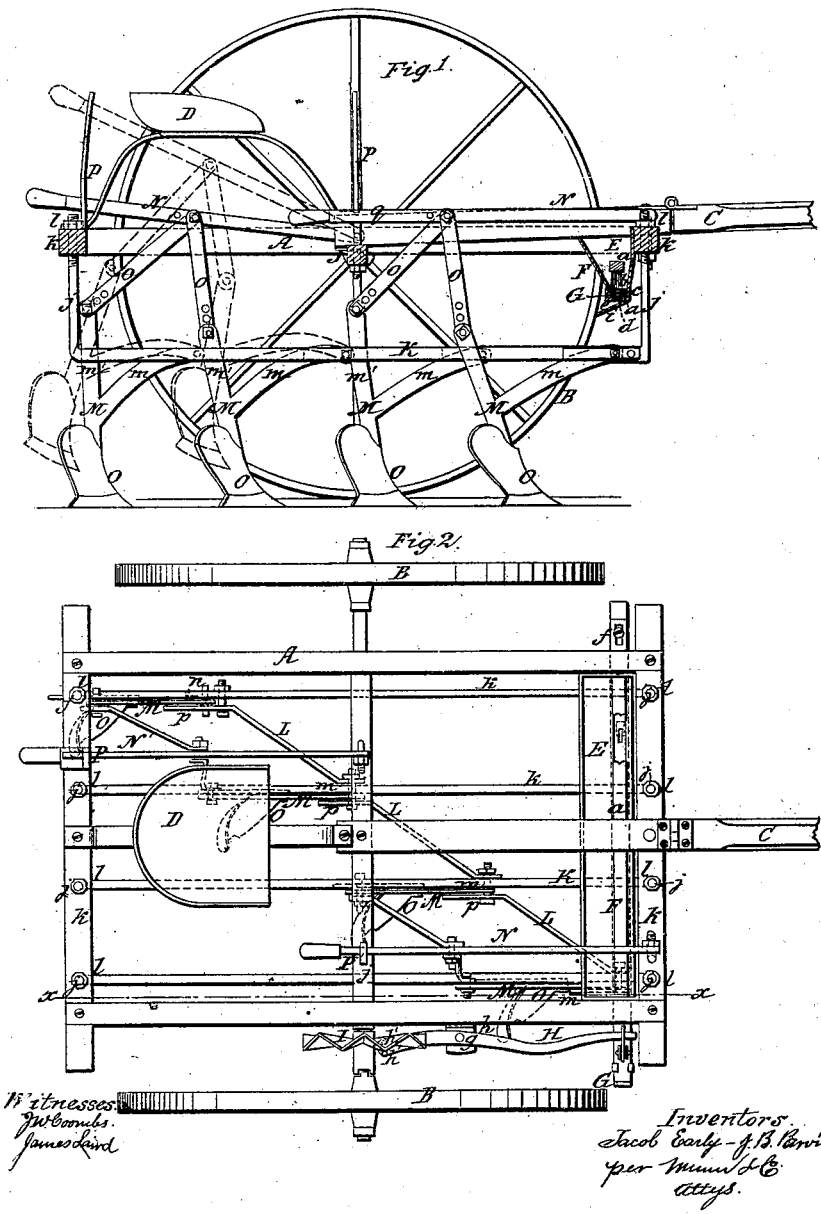

JACOB EARLY AND J. B. PARVIN, OF HIGHTSTOWN, NEW JERSEY.

IMPROVEMENT IN SEEDING-MACHINES.

Specification forming part of Letters Patent No. 33,881, dated December 10, 1861.

*To all whom it may concern:*

Be it known that we, JACOB EARLY and J. B. PARVIN, both of Hightstown, in the county of Mercer and State of New Jersey, have invented a new and Improved Plow and Seeding-Machine; and we do hereby declare that the following is a full, clear, and exact description of the same, reference being had to the accompanying drawings, making a part of this specification, in which—

Figure 1 is a side sectional view of our invention, taken in the line $x\ x$, Fig. 2; Fig. 2, a plan or top view of the same.

Similar letters of reference indicate corresponding parts in the two figures.

This invention relates to an improved seeding-machine of that class designed for sowing seed broadcast and plowing in or covering the seed simultaneously with the planting thereof.

The object of the invention is to obtain a simple and efficient seed-distributing apparatus which may be readily regulated to sow seed in greater or less quantities on a given area and in full view of the driver, so that any irregularity in the sowing may be observed and corrected immediately.

The invention also has for its object the arranging of the plows or seed-coverers in such a manner that they will, while at work, be retained properly in position and be capable of being readily raised and lowered by the driver from his seat, and also readily adjusted to penetrate the earth at a greater or less depth, as may be desired.

To enable those skilled in the art to fully understand and construct our invention, we will proceed to describe it.

A represents a rectangular frame, which is mounted on two wheels, B B, has a draft-pole, C, attached, and a driver's seat, D.

To the front part of the frame A there is secured a seed-box, E, which extends the whole width of the frames, and has a cut-off brush, F, fitted within it. The brush F is formed of a bar, $a$, with bristles $b$ fitted into it at equal distances apart. The bottom $c$ of the seed-box E is perforated with holes $d$ at equal distances apart, corresponding with the distances between the bristles $b$ of the brush F. In the lower part of the seed-box E there is placed a reciprocating slide, G, which is formed of two perforated plates, $e\ e$, placed one over the other and adjusted by means of a screw, $f$, at one end. The plates $e\ e$ are adjusted longitudinally for the purpose of varying the dimensions of the holes or perforations $a^x$ to admit more or less seed through them, as may be required. The slide G has a lever, H, connected to it at one end, said lever having its fulcrum at $g$ on a pendent plate, $h$, attached to the frame A. The back end of the lever H has two vertical pins, $h'\ h'$, attached to it, between which a zigzag or serpentine cam, I, works, said cam being on the axle J of the wheels B B, as shown in Fig. 2.

To the bottom of the seed-box E there is attached an inclined plate, $i$, which extends the whole length of the box and inclines downward toward the back part of the machine, as shown in Fig. 1.

To the frame A there are attached longitudinally a series of bars, K. These bars are bent upward at right angles at their front and back ends, as shown at $j$, and said parts $j$ have screw-threads cut on them and pass through the front and back bars, $k\ k$, of the frame A, and are provided with nuts $l$, by turning which the bars K may be raised and lowered. This will be fully understood by referring to Fig. 1.

The bars K are braced by oblique or diagonal bars L, as shown in Fig. 2.

M represents plow-standards, which may be described as being of V form or forked at their upper ends. One of the arms, $m$, of each standard is connected at its front end to a bar, K, at or near its junction with its brace L, and it is designed to have the arms $m$ attached to the bars K by wooden pins $n$, as shown in Fig. 2. The other arms, $m'$, of the standards are connected by links $o$ to levers N N', one of which, N, is attached to the front bar $k$ of the frame A and the other, N', attached to the axle J. The front parts of the arms $m$ work between the bars K and parallel portions $p$ of the braces L, as shown in Fig. 2. The bars K and said parallel portions $p$ serve as guides and keep the plow-standards M in proper position, preventing the plows O, which are secured to the lever ends of the standards, from working or moving laterally.

In order to elevate the plows O above the surface of the ground all that is required on the part of the operator is to elevate the levers N N', and these levers, and consequently the plows, may be retained in an elevated positon by placing the back parts of the levers in the upper ends of supports P P. By pressing down said levers the plows O may be forced into the earth and retained in a horizontal position while performing their work, the levers being secured in a depressed state by fitting in notches $q$ in the supports P P. The wooden pins $u$ break in case the plows come in contact with any obstruction, and allow the plows to be thrown back, so that they can pass over the obstruction without injury to any of the parts of the machine.

The plows O are placed one in advance of the other in an oblique line, so as to effectually cover the seed which is distributed from the box E by the reciprocating movement of the slide G, said movement being given the slide by means of the cam I and lever H. The inclined plate $i$ serves as a scatterer, and causes the seed to fall upon the ground in full view of the driver on seat D.

The quantity of seed to be sown on a given area is regulated, as before stated, by adjusting the plates $e$ $e$ longitudinally, so as to regulate the size of the discharge holes or perforations in slide G. The seed is discharged when the perforations or holes $a^\times$ of said slide are in line with the holes or perforations $d$ in the bottom $c$ of the seed-box and the bristles $b$ of the brush F are over the holes $a^\times$ of the slide.

The device as a whole is extremely simple and efficient, and may be constructed at a reasonable cost.

Having thus described our invention, what we claim as new, and desire to secure by Letters Patent, is—

1. The reciprocating slide G, formed of two adjustable perforated plates, $e$ $e$, in combination with the stationary cut-off brush F and perforated bottom $c$ of the seed-box E, all arranged as and for the purpose set forth.

2. The combination and arrangement of the parallel adjustable bars K, oblique braces L, plow-standards M, and levers N N', substantially as and for the purpose set forth.

JACOB EARLY.
JONATHAN B. PARVIN.

Witnesses:
CLAYTON I. COWARD,
RICHARD A. OUTCUTT.